United States Patent
Hershenson

[15] 3,694,432
[45] Sept. 26, 1972

[54] 2-BENZYLOXYIMINO CYCLIC AMINES
[72] Inventor: Fred M. Hershenson, Morton Grove, Ill. 60053
[73] Assignee: G. D. Searle and Company, Chicago, Ill.
[22] Filed: March 1, 1971
[21] Appl. No.: 119,907

[52] U.S. Cl. ....260/239 B, 260/239 BE, 260/293.62, 260/293.78, 260/296 M, 260/326.5 L, 424/244, 424/267, 424/274
[51] Int. Cl.....C07d 27/02, C07d 29/26, C07d 41/04
[58] Field of Search......260/239 B, 239 BE, 326.5 L, 260/293.62, 293.78, 296 M Primary Examiner—Alton D. Rollins
Attorney—John M. Brown, John J. Kolano, Elliot N. Schubert, Lowell C. Bergstedt, Sybil Meloy, Walter C. Ramm and Helmuth A. Wegner

[57] ABSTRACT

Cyclic amines having a benzyloxyimino substituent at the 2-position are described herein. They possess anti-hypertensive, anti-protozoal, anti-fungal, and anti-algal activity. The compounds are prepared from the appropriate 2-alkoxy cyclic amine or 2-hydroxyimino cyclic amine.

5 Claims, No Drawings

2-BENZYLOXYIMINO CYCLIC AMINES

The present invention relates to a group of compounds which are 2-benzyloxyimino derivatives of cyclic amines. MOre particularly, it relates to a group of compounds having the following general formula

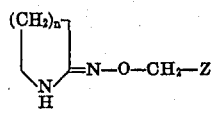

wherein n is a whole number between 1 and 3 inclusive; and Z is selected from the group consisting of phenyl, naphthyl, tolyl, xylyl, halophenyl, and dihalophenyl. The halogen in the halophenyl and dihalophenyl radicals referred to above include fluorine, chlorine, bromine, and iodine.

The organic bases of this invention form pharmaceutically acceptable salts with a variety of inorganic and strong organic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids.

The compounds of the present invention are prepared by the reaction of a benzyl halide with a 1-hydroxyimino cyclic amine of the following formula

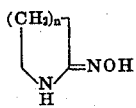

wherein *n* is a whole number between 1 and 3 inclusive. The hydroxyimino compound is converted to the corresponding salt by means of a strong base such as sodium methoxide and this salt is then reacted with the benzyl halide. The reaction is most conveniently carried out in an alcoholic solution corresponding to that from which the strong base is derived.

Alternatively, the present compounds can be prepared by the reaction of a O-benzylhydroxylamine with an imido ester of the following formula

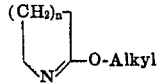

wherein *n* is a whole number between 1 and 3 inclusive and alkyl is preferably methyl. The reactants are conveniently refluxed overnight in a solvent such as methanol.

The present compounds are useful as anti-hypertensive agents. They are also useful as anti-biotic agents against a variety of organisms. Thus, they inhibit the growth of protozoa such as *Trichomonas vaginalis* and *Tetrahymena pyriformis;* fungi such as *Trichophyton mentagrophytes, Candida albicans, Fusarium* species, and *Verticillium albo-atrum;* and algae such as *Chlorella vulgaris.* present compounds can thus be combined with various known excipients and adjuvants in the form of dusts, solutions, suspensions, ointments, and sprays to provide compositions useful for disinfecting purposes.

Evidence of the anti-protozoal utility of the present compounds is provided by a standardized test for their capacity to inhibit the growth of *Tetrahymena pyriformis* which is carried out in the following manner. A solution is prepared from 24 grams of proteose peptone, 16 grams of sucrose and 1,000 ml. of distilled water. 0.5 Ml. of this solution is inoculated with 10 percent of a 4 to 7 day old culture of *Tetrahymena pyriformis* and the resultant mixture is added to 0.5 ml. of a solution or suspension containing 2,000 micrograms of test compound per milliliter of solution. The resultant mixture is incubated at room temperature for 48 hours and then examined microscopically for the presence of motile protozoa. If any are observed, the compound is considered inactive at a concentration of 1,000 micrograms per milliliter. If no motile protozoa are observed, 0.1 ml. of the solution or suspension is transferred from the original vial to 0.9 ml. of a solution which is prepared from 12 grams of proteose peptone, 8 grams of sucrose, and 1,000 ml. of distilled water and which has been inoculated with 5 percent of a 4 to 7 day old culture of *Tetrahymena pyriformis* and the resultant mixture is thoroughly mixed. 0.1 Ml. of this preparation is transferred similarly to a second vial of inoculated medium and, after mixing, 0.1 ml. of this new preparation is similarly transferred to a third vial. The resultant mixtures are incubated as before and examined microscopically for the presence of motile protozoa. The resulting solutions contain the test compounds at concentrations of 100, 10, and 1 microgram per milliliter, respectively. Controls are provided by concurrent incubations identical with the foregoing except for the absence of test compound. When 2-benzyloxyiminopyrrolidine, 2-(4- chlorobenzyloxyimino)pyrrolidine, and 2-(2-chlorobenzyloxy)-hexahydro-2H-azepine were tested by the above procedure, each inhibited the protozoa at a concentration of 1,000 micrograms per milliliter or less.

The following examples are presented to further illustrate the present invention; they should not be construed as limiting it in spirit or in scope. In these examples, temperatures are indicated in degrees centigrade (°C.) and quantities are indicated in parts by weight unless parts by volume are specified. The relationship existing between parts by weight and parts by volume is the same as that existing between grams and milliliters.

EXAMPLE 1

A solution of 2.0 parts of 2-methoxy-1-pyrroline, 3.5 parts of O-benzylhydroxylamine hydrochloride and 2.4 parts of sodium bicarbonate in 20 parts of methanol and 15 parts of water is refluxed for 22 hours. The mixture is cooled and 25 parts of water is added and an oil forms. The mixture is extracted with 3 portions of chloroform and the combined chloroform extracts are dried over anhydrous magnesium sulfate. The solvent is then removed under reduced pressure and the residual oil is distilled to give 2-benzyloxyiminopyrrolidine boiling at about 123°–127° C. at 0.6 mm. pressure.

The oil is dissolved in 35 parts of ether and 75 parts by volume of an ether solution saturated with hydrogen chloride gas is added. The white precipitate which forms is separated by filtration and washed with ether to give 2-benzyloxyiminopyrrolidine hydrochloride melting at about 162°–165° C. The free base of this compound has the following formula

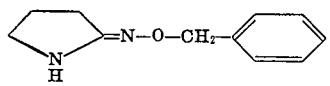

EXAMPLE 2

A solution of 2.0 parts of 2-pyrrolidone oxime in 20 parts of methanol is cooled to 10° C. and there is added, with stirring, a solution of 1.1 part of sodium methoxide in 16 parts of methanol. The resultant solution is stirred at 15°–20° C. for 30 minutes and then there is added portionwise, with stirring, a solution of 2.9 parts of 2-fluorobenzyl chloride in 5 parts of methanol. The mixture is stirred at room temperature for 45 minutes and it is then heated at reflux for 3 hours. After the mixture is allowed to stand at room temperature for 16 hours, it is filtered and 100 parts of water is added to the filtrate. The mixture is then extracted with 2 portions of chloroform and the combined chloroform extracts are washed with water and dried over sodium sulfate. The solvent is removed under reduced pressure and the residue is distilled to give a liquid boiling at about 118°–119° C. at 0.4 mm. pressure. This liquid is dissolved in 35 parts of ether and 5 parts by volume of a 25 percent solution of hydrogen chloride in 2-propanol is added. The precipitate which forms is separated by filtration and washed with ether and then recrystallized from acetonitrile. The product obtained in this way is 2-(2fluorobenzyloxyimino)-pyrrolidine melting at about 173°–175° C.

EXAMPLE 3

If the procedure of Example 2 is repeated using 2-pyrrolidone oxime and 4-chlorobenzyl chloride, 2-(4-chloro-benzyloxyimino)pyrrolidine is first obtained as a liquid boiling at about 135°–137° C. at 0.25 mm. pressure. This material solidifies and is recrystallized from hexane to give a solid melting at about 68°–69.5° C. Reaction of this material with isopropanolic hydrogen chloride gives the corresponding hydrochloride melting at about 170.5°–171.5° C.

Similarly, 2-pyrrolidone oxime is converted to the sodium salt and reacted with 4-methylbenzyl chloride to give 2-(4-methylbenzyloxyimino) pyrrolidine.

In a similar manner, 2-pyrrolidone oxime is converted to the sodium salt and reacted with 2,6-dichlorobenzyl chloride. In this case, it is not necessary to distill the crude product because it solidifies when triturated with a small amount of hexane. The solid is recrystallized from hexane to give 2-(2,6-dichlorobenzyloxyimino)pyrrolidine melting at about 87°–94 C. This solid is dissolved in ether and reacted with hydrogen chloride gas in 2-propanol. The solid which precipitates is separated by filtration and recrystallized from acetonitrile to give 2-(2,6-dichlorobenzyloxyimino)pyrrolidine melting at about 182.5°–184° C.

EXAMPLE 4

A solution of 7.5 parts of 2-pyrrolidone oxime in 80 parts of methanol is treated at room temperature with a solution of 4 parts of sodium methoxide in 8 parts of methanol. The resulting solution is stirred at room temperature for 1 hour and then 17.7 parts of 1-chloromethylnaphthalene is added. The mixture is then refluxed for 4 hours before it is cooled and filtered and the solvent is evaporated from the filtrate under reduced pressure. The resulting orange semi-solid residue is partitioned between 90 parts of benzene and 100 parts of 5 percent aqueous hydrochloric acid. Three layers form and the thick lower layer is removed. The remaining two layers are separated and the aqueous layer is extracted a second time with benzene. The acidic aqueous layer is then made alkaline by the addition of 50 parts of 10 percent aqueous sodium hydroxide solution and the resulting mixture is extracted with 3 portions of chloroform. The combined chloroform extracts are washed with water and dried over anhydrous sodium sulfate. The solvent is evaporated under reduced pressure and the residue is distilled to give a yellow-orange oil boiling at about 176°–180° C. at 0.3 mm. pressure. The oil is dissolved in 175 parts of ether and hydrogen chloride in 2-propanol is added until no further precipitation takes place. The solid is then separated by filtration and washed with ether; it is recrystallized from a mixture of ethanol and ether to give 2-(1-naphthylmethoxyimino)-pyrrolidine hydrochloride melting at about 115°–120° C., 150–153°C. The free base of this compound has the following formula

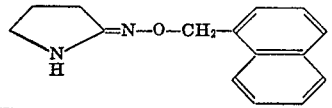

EXAMPLE 5

A solution of 6.5 parts of hexahydro-2H-azepin-2-one oxime in 80 parts of methanol is treated with a solution of 2.7 parts of sodium methoxide in 20 parts of methanol and the resulting mixture is stirred at 25° C. for 1.5 hours. To this solution is added 16.1 parts of 2-chlorobenzyl chloride and the mixture is heated at reflux for 4 hours. It is then cooled and filtered and the solvent is evaporated from the filtrate under reduced pressure. The residue is dissolved in 100 parts of 5 percent hydrochloric acid and this is extracted with benzene. The aqueous solution is made alkaline with 5 percent aqueous sodium hydroxide solution and it is then extracted with 2 portions of chloroform. The combined chloroform extracts are dried over sodium sulfate and the solvent is evaporated under reduced pressure to leave a residual oil. Distillation of the oil gives material boiling at about 150°–155° C. at 0.3 mm. pressure. The oil is dissolved in 45 parts of ether and a solution of hydrogen chloride in 2-propanol is added. The precipitate which forms is separated by filtration and washed with ether to give 2-(2-chlorobenzyl-oxyimino)hexahydro-2H-azepine hydrochloride melting at about 183°–184° C. The free base of this compound has the following formula

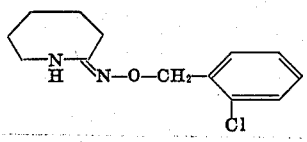

EXAMPLE 6

The procedure of Example 5 is repeated using 3.2 parts of hexahydro-2H-azepin-2-one oxime and 8 parts of 3-chlorobenzyl chloride. This first gives 2-(3-chlorobenzyl-oxyimino)hexahydro-2H-azepine boiling at about 149°–152° C. at 0.3 mm. pressure. This is then converted to the hydrochloride salt which melts at about 162°–163° C. after recrystallization from a mixture of ethanol and ether.

In a similar manner, 6.4 parts of hexahydro-2H-azepin-2-one oxime is reacted with 16.1 parts of 4-chlorobenzyl chloride. In this case, the crude product solidifies on cooling so it is not distilled. The crude solidified solid is triturated with hexane and the solid remaining is removed by filtration and washed several times with hexane. The solvent is then evaporated from the hexane filtrate and the resulting solid is dissolved in 70 parts of dry ether and hydrogen chloride in 2-propanol is added. The solid which precipitates is separated by filtration and recrystallized from acetone to give 2-(4-chlorobenzyloxyimino)hexahydro-2H-azepine hydrochloride melting at about 168°–169° C.

Similarly, hexahydro-2H-azepin-2-one oxime reacts with 2,6-dimethylbenzyl chloride to give 2-(2,6-dimethyl-benzyloxyimino)hexahydro-2H-azepine as the hydrochloride.

EXAMPLE 7

A solution of 6.4 parts of hexahydro-2H-azepin-2-one oxime in 80 parts of methanol is treated with 2.7 parts of sodium methoxide in 20 parts of methanol and the resulting mixture is stirred at room temperature for 90 minutes. Then, 19.6 parts of 2,6-dichlorobenzyl chloride is added in one portion and the mixture is refluxed for 3 hours. It is then cooled to room temperature and filtered and 150 parts of water is added to the filtrate. The filtrate is extracted with 3 portions of chloroform and the combined chloroform extracts are washed with water and dried over sodium sulfate. The solvent is then evaporated under reduced pressure and the residual yellow oil is extracted by boiling with 75 parts by volume of hexane. The mixture is filtered and cooled and the solid which precipitates is separated by filtration and dissolved in anhydrous ether. The ether solution is treated with hydrogen chloride in 2-propanol and the supernatant liquid is decanted from the gummy hydrochloride precipitate. This is washed with several portions of ether and then recrystallized from a mixture of ethanol and ether to give 2-(2,6-dichlorobenzyloxyimino)hexahydro-2H-azepine hydrochloride melting at about 173.5°–174°C.

EXAMPLE 8

The procedure of Example 2 is repeated using 2-piperidone oxime and 4-chlorobenzyl chloride. The product obtained is 2-(4-chlorobenzyloxyimino)piperidone hydrochloride.

What is claimed is:

1. A compound of the formula

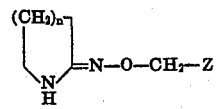

wherein n is a whole number between 1 and 3 inclusive; and Z is selected from the group consisting of phenyl, naphthyl, tolyl, xylyl, halophenyl, and dihalophenyl.

2. A compound according to claim 1 which is 2-(1-naphthylmethoxyimino)pyrrolidine.

3. A compound according to claim 1 which has the formula

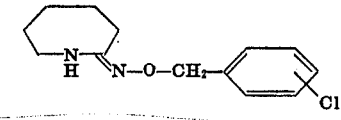

4. A compound according to claim 1 which is 2-(2-chlorobenzyloxyimino)hexahydro-2H-azepine.

5. A compound according to claim 1 which is 2-(2,6-dichlorobenzyloxyimino)hexahydro-2H-asepine.

* * * * *

UNITED STATES PATENT OFFICE
CERTIFICATE OF CORRECTION

Patent No. 3,694,432      Dated September 26, 1972

Inventor(s) Fred M. Hershenson

It is certified that error appears in the above-identified patent and that said Letters Patent are hereby corrected as shown below:

Column 1, line 67, "present compounds" should be -- The present compounds --;

Column 3, line 39, "(2fluorobenzyloxyimino)-" should be -- (2-fluorobenzyloxyimino)- --;

Column 3, line 40, "-175°C." should be -- -175.5°C. --; and

Column 6, line 18, ")piperidone" should be -- )piperidine --.

Signed and sealed this 18th day of December 1973.

(SEAL)
Attest:

EDWARD M. FLETCHER, JR.        RENE D. TEGTMEYER
Attesting Officer              Acting Commissioner of Patents